April 21, 1964     B. WINSTON     3,130,248
LOCOMOTIVE AERATORS FOR FISH TANKS
Filed Oct. 19, 1960
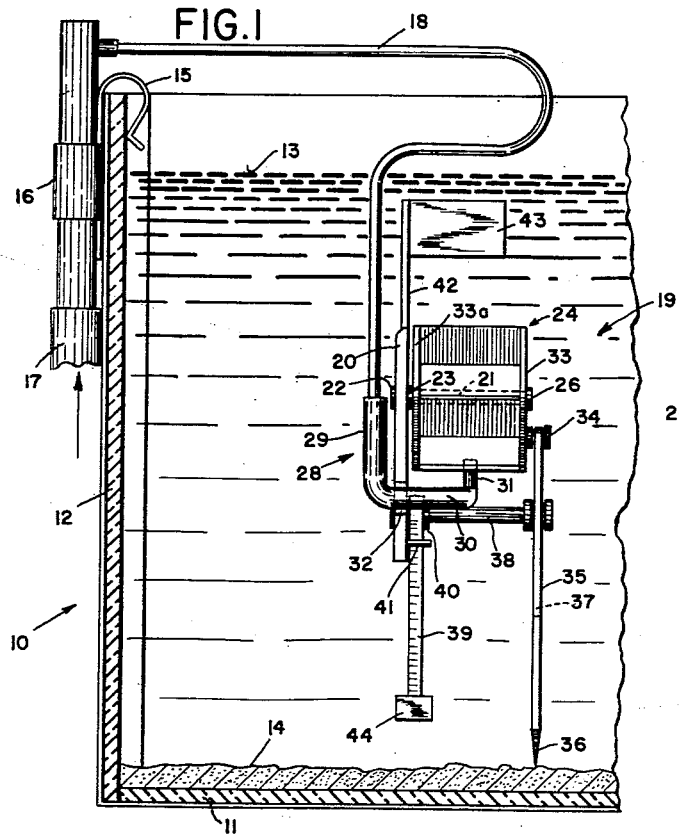
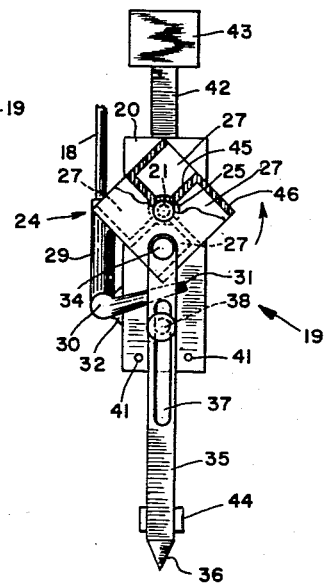
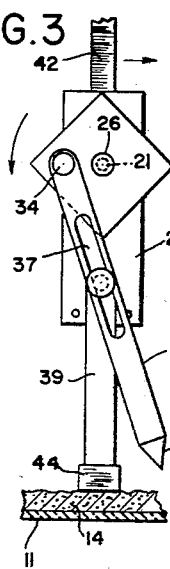
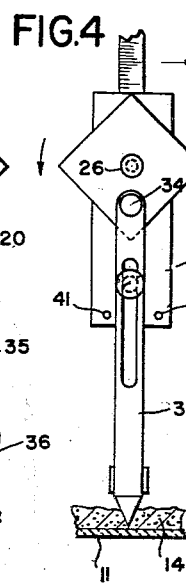
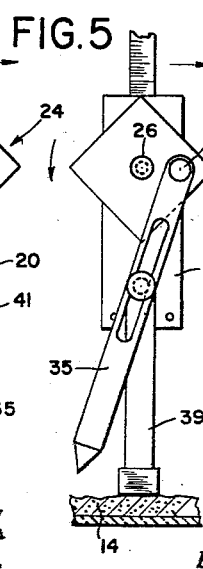
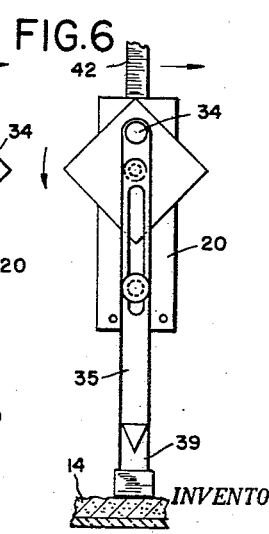
INVENTOR.
BERTRAM WINSTON
BY  F. Ledermann
ATTORNEY

United States Patent Office 3,130,248
Patented Apr. 21, 1964

3,130,248
LOCOMOTIVE AERATORS FOR FISH TANKS
Bertram Winston, 176 Clarkson Ave., Brooklyn 26, N.Y.
Filed Oct. 19, 1960, Ser. No. 63,626
1 Claim. (Cl. 261—121)

This invention relates to aerators for aquarium tanks and a primary object of the invention is the provision of a locomotive aerator which includes a motor or turbine actuated by bubbles of air rising from the outlet of a flexible hose leading from a conventional air pump of the kind used as standard equipment in home fish tanks. As a consequence of the operation of the motor by the air bubbles and two substantially vertical pivoted legs actuated by the motor, the device reproduces a walking motion whereby it moves or walks along the bottom of the tank from a starting position near the point of connection of the hose to a wall of the tank. When the device has moved through the distance permitted by the length of the hose it will be brought to a halt but it will continue its up and down stepping motion in simulation of a "marking time" or hopping movement. However, the device may then be lifted by hand and replaced in its starting position to repeat its walk along the tank floor.

Another object of the invention is the provision of a device such as indicated above wherein the air operated motor actuates a depending leg in a swinging walking motion and the device includes a second freely suspended leg cooperating with the motor-actuated leg to cause the device to walk.

A still further object of the invention is the provision of the locomotive aerator with means to maintain it in upright position and also means to maintain it at a level below the surface of the water in the tank so that it may walk along the bottom of the tank.

Although the device of the present invention is illustrated and described herein only to the extent that a locomotive aerator is provided, it is to be understood that the device is disclosed only in skeleton form and that it may be provided with a cover, or clothed, in any suitable manner to represent an animal, fish, bird, or an underwater boat or ship, or the like, or a person such as a deep sea diver or swimmer.

The above as well as additional objects will be clarified in the following description wherein reference numerals refer to like-numbered parts in the accompanying drawing. It is to be noted that the drawing is intended primarily for the purpose of illustration and that it is therefore neither desired nor intended to limit the invention necessarily to any or all of the exact details shown or described except insofar as they may be deemed essential to the invention.

Referring briefly to the drawing, FIG. 1 is a fragmentary sectional view of a fish tank showing the locomotive aerator of the present invention in front elevation as well as showing the hose connected thereto and the manner of securing the hose to the tank wall.

FIG. 2 is a side elevational view of the locomotive aerator per se, with parts broken away and partly in section.

FIGS. 3 to 6, inclusive, show the relative positions of the operating parts of the device while the motor goes through a cycle of rotation, the successive steps being a quadrant of a cycle apart.

Referring in detail to the drawing, the numeral 10 indicates a fish tank having the bottom wall 11 and a side wall 12. The tank is shown to contain water to a level 13 and, on the bottom, a depth of sand or gravel 14.

By means of a suitable clamp 15, a connector or union 16 into one end 17 of which the outlet of an air pump, not shown, is connected, is attached to the tank wall 12. From the other end of the connector 16 a flexible, light weight and preferably thin plastic hose 18 leads to the locomotive aerator 19. The hose 18 is of no particular shape, nor does it have any stiffening means. The manner of its showing in FIG. 1 is intended merely to represent a thin flexible hose.

The aerator 19 includes an elongated upright panel or frame 20 which may also be termed the main body of the device. A pin 21, serving as an axle, has one end anchored in the panel 20 between two heads 22 and 23 on the pin; the head 22 may be in the form of a nut. A bucket motor 24 is rotatably mounted on this pin and has an axial sleeve 25 surrounding the pin. At the outer end of the pin is a head or nut 26. The motor illustrated contains four bucket compartments 27.

Attached to the panel 20 is a rigid deformed tube 28 comprising a vertical top section 29, an intermediate section 30, which is horizontal, and an end section or tip 31 which tilts upward. The tube 28 is attached to the body 20 in any desired manner; for example, by means of cement 32 between the forward edge of the body and the intermediate section 30. The tube 28 is positioned as shown in FIGS. 1 and 2, with the outlet of the tip or nozzle 31 positioned in the lower right-hand quadrant of the motor 24. The tube 18 is frictionally held in the upper or vertical portion 29 of the tube 28. If desired, a swivel coupling, not shown, may be provided between the section 29 and the tube 18.

It is now apparent from FIG. 2 that as air bubbles rise from the tip 31 they will enter the bucket compartment 27 whose opening is to the right of the vertical median plane through the axis or pin 21 of the motor, thus causing the latter to rotate counter-clockwise. Continuous flow of air from the tip 31 will cause continuous rotation of the motor.

On the side of the motor which is remote from the panel 20, that is, the side 33, a pin 34 is mounted eccentric to the axle pin 21. A leg 35 is pivotally suspended from the pin 34 and is preferably provided with a tapered or pointed lower extremity 36. The leg 35 has an elongated longitudinal slot 37. Below the motor 24 and in the vertical plane through the pin 21, a second pin 38 is anchored at one end to the panel 20 and extends at the other end through the slot 37. A second and shorter leg 39 is pivotally suspended from the pin 38 closely adjacent the panel 20 and restrained from movement along the pin by a collar 40 on the pin. Horizontally spaced stops or pegs 41 on the panel 20 limit the arc through which the leg 39 can swing from the vertical. The leg 39 has a weight 44 on its lower end.

Since it is necessary that the entire device be submerged and positioned so that it may move about or walk on the bottom of the tank, a float 43 of some sort, mounted on an upward extension 42 of the body or frame 20, is required to give the device a buoyancy which is, however, insufficient to lift the device from the tank floor. All of the parts of the device except for the pins 21 and 38 are preferably made of light weight material such as plastic; the weighted lower end of the leg together with the float 43, tend to maintain the device in upright position.

FIGS. 3 through 6 show successive steps by which the aerator walks on the bottom of the tank, the steps having intervals of a quarter turn of the motor 24. Assuming that the motor begins actuation when the elements of the device are positioned as shown in FIG. 3, with the motor turning counter-clockwise as indicated by the arrow to the left of the motor, it is apparent that the leg 35 will be moved from the position shown in FIG. 3 to that shown in FIG. 4. In FIG. 4 the suspended leg 39 is in contact with the gravel surface 14. As the leg 35 moves into the position shown in FIG. 4, and the tip 36 thereof finds support on the floor 11, the device will move in the direction of the arrow to the right of the extension 42, i.e., to the right. In the upright position (FIG. 4) of the leg 35 the leg 39 hangs freely with its lower extremity raised above the gravel surface, and it began to rise into that position before the leg 35 reached the vertical position. Also, the tip 36 of the leg 35 contacted the floor before it reached the vertical position so that between its first contact with the floor and its achievement of the vertical position of FIG. 4 it moved the entire device a short distance to the right. In moving into the position of FIG. 5, the leg 35 will again have moved the device a distance to the right during that time of the movement of the leg while it remained in contact with the floor. In FIG. 5 the device is again supported by the leg 39 which rests upon the gravel. As the leg 35 moves from the position shown in FIG. 5 to that shown in FIG. 6 the device remains supported on the leg 39, so that the device does not walk during the quarter turn of the motor between FIG. 5 and FIG. 6; nor does it walk between the positions shown in FIG. 6 and FIG. 3. The walking of the device occurs only during an interval of time intermediate the time the leg 35 moves from the position thereof in FIG. 3 and the position thereof in FIG. 5, for during the remainder of the cycle of rotation of the motor the device is supported on the leg 39.

When the device has walked away from the point of attachment of the hose 18 to the tank wall, the gradual tensing of the hose will cause the device to come to a halt but, as mentioned above, continue its up and down movement.

While the invention has been described with particular reference to the structure shown in the drawing, it is to be understood that such is not to be considered a limitation of the invention which is best defined in the accompanying claim.

Any type of suitable motor may be used, which functions in the required manner as does the motor 24. The bucket compartments 27 in the example illustrated serve the purpose, in that each is formed by a radial plate 45 and a plate 46 at right angles thereto and extending, FIG. 2, clockwise from the outer edge of the radial plate, the sides of the compartments being closed by the two outer or side plates 33 and 33a.

In order that the device may remain upright in the water and at the same time have one or the other of the legs 35, 39 rest lightly on the bottom of the tank, a balance must be obtained between the weight of the device including the weight 44 on the leg 39 and the buoyancy of the float 43. Such a balance can of course be readily obtained by proper design and, although it is not a matter of invention, nevertheless it is an essential feature in the proper functioning of the device.

As a consequence of the locomotion of the aerator, the air admitted into the water is distributed in constantly varying positions of the tank while the device is moving along the floor of the tank, and at all times the air bubbles rise from varying horizontal levels in the water, instead of being emitted at all times from a fixed point as is commonly done. This is a desirable feature, as is readily understandable.

During the operation of the aerator the leg 39 is free to swing about its pivot; the pegs or stops 41 serve to limit the swing of this leg through a small arc and thus less power is required to rotate the motor.

The invention having thus been described, what is claimed and desired to be secured by Letters Patent is as follows:

In combination, a fish tank containing water, a locomotive aerator, and a flexible hose, means for securing one end of the hose to a wall of the tank, the aerator comprising an upright body having a horizontal axle extending from one side thereof, a bucket motor rotatably mounted on said axle and including two end plates at right angles to the axle and means forming circumferentially spaced transverse buckets between said end plates, the end plate remote from the body having an eccentric pin thereon, a first substantially vertical relatively long leg having the upper end thereof pivotally mounted on said pin and having a longitudinal slot therein, tube means secured to said body having an air inlet end and an air outlet end, said outlet end being positioned below the motor to direct air bubbles rising therefrom tangentially against said bucket means to rotate the same, said flexible hose having the other end thereof attached to the air inlet end of said tube means, an elongated horizontal pin extending from said body in the vertical plane of said axle and positioned below the bucket means, said elongated pin registering in said slot, a second substantially vertical relatively short leg having the upper end thereof pivotally mounted adjacent said body on said elongated pin, said second leg being weighted and said body having a float on the upper end thereof of a buoyancy sufficient normally to maintain the aerator substantially upright with at least one of said legs contacting the floor of the tank, said body having two projections on said side thereof positioned below said elongated pin and spaced laterally from the opposed longitudinal edges of said second leg, and means to supply air to said hose.

References Cited in the file of this patent

UNITED STATES PATENTS

| 2,660,655 | Powell | Nov. 24, 1953 |
| 2,732,341 | Huff | Jan. 24, 1956 |
| 2,923,954 | Babcock | Feb. 9, 1960 |

FOREIGN PATENTS

| 1,207,073 | France | Aug. 31, 1959 |